Patented Oct. 5, 1954

2,691,046

UNITED STATES PATENT OFFICE 2,691,046

PROCESS FOR THE MANUFACTURE OF OXYGENATED COMPOUNDS WITH IMPROVED CATALYSTS

Robert H. Hasek, Kingsport, Tenn., assignor to Eastman Kodak Company, Rochester, N. Y., a corporation of New Jersey No Drawing. Application April 22, 1948, Serial No. 22,715

3 Claims. (Cl. 260—604)

This invention relates to the production of an improved catalyst and the employment of the catalyst in the synthesis of oxygenated compounds. More particularly the invention is concerned with improving the reaction of organic compounds containing a double bond such as the reaction of the various olefins with carbon monoxide and hydrogen for the production of carbonyl compounds such as aldehydes. In order to facilitate this type of reaction an improved catalyst together with its method of manufacture has been provided.

There are a number of publications and patents outstanding which describe the reaction of various types of olefins, both aliphatic and cyclic, with carbon monoxide and hydrogen in the presence of various different catalysts, but not catalysts comparable to the catalyst of the present invention, for producing reaction products of the type indicated. Therefore, it is already apparent from the prior art that various olefinic compounds or similar type compounds containing a double bond may be caused to react with carbon monoxide and hydrogen. The most interesting prior art of which I am aware comprises certain foreign descriptions concerning a German process for reacting olefins with water gas. However, these prior art processes were carried out in the presence of a solid type catalyst, for example, made up of cobalt, thoria, magnesia, and kieselguhr in toluene as a diluent.

The prior art use and preparation of such solid type catalyst is disadvantageous in that the preparation of such a catalyst usually entails the determination and maintenance of exacting conditions of manufacture. That is, special methods of precipitation, washing, drying, grinding or pelleting, activation, and regeneration are involved. If the catalyst is used as a fixed bed, the reactor must be dismantled from time to time for cleaning and repacking with fresh catalyst. When the prior art catalyst is suspended in a liquid medium an erosive slurry is obtained which causes severe erosion in pumps, check valves, pipe elbows, and the like. Therefore, it can be said that the use of a heterogeneous catalyst in accordance with the prior art is disadvantageous and expensive for the several reasons aforementioned.

I have found that a simpler and improved catalyst may be prepared and that reactions of the class indicated above may be materially facilitated or otherwise better carried out as will be described in detail hereinafter.

This invention has for an object to provide an improved catalyst and method of manufacture. A further object is to provide an improved process for the reaction of organic compounds containing a double bond with carbon monoxide and hydrogen. Another object is to provide a homogeneous catalyst solution that is non-erosive and otherwise advantageous in its utilization in carrying out reactions of olefins with carbon monoxide and hydrogen. Still a further object is to provide a process for the production of carbonyl compounds from the reaction of olefins, carbon monoxide, and hydrogen, which may be carried out faster than was possible in the prior art and with the utilization of a relatively small amount of catalyst as compared with the large amounts of catalyst heretofore utilized. Still another object is to provide a process of the class indicated wherein the very active catalyst may be formed in situ. Still a further object is to provide an improved continuous process wherein certain of the component parts may be recirculated or otherwise utilized. Further objects will appear hereinafter.

As indicated above, a heterogeneous type catalyst was used in the prior art and presented certain disadvantages. In accordance with the broader aspects of the present invention a homogeneous or solution type catalyst may be prepared to specification with fewer variables, which facilitates the consistent preparation of uniformly active reaction mixtures. Such utilization of a homogeneous catalyst in accordance with the present invention permits the adjustment, replenishing, or recycling of the reaction medium without dismantling the process equipment. The problem of erosion of equipment due to the abrasive action of a slurry is nonexistent in my process utilizing a homogeneous catalyst. In addition to the preparation and utilization of a homogeneous catalyst it will be observed that certain species of my invention relate to the formation of the catalyst and carrying out of the reaction of olefins, carbon monoxide, and hydrogen in situ, as will be set forth in detail hereinafter.

In the description which immediately follows concerning the preparation of a homogeneous active catalyst, cobalt is described as the preferred catalytic metal. However, it will be kept in mind that the principles of my invention may be applied to the treatment of cobalt mixed with other components such as iron, or to the treatment of other catalytic metals which function in the process of the class described. It will be further kept in mind that prior to my invention described herein of making an active homogeneous cobalt catalyst, for example, a homogeneous catalyst solution containing cobalt tetracarbonyl, that the manufacture of any comparable cobalt compounds in the prior art has involved the processing of activated cobalt metal or of cobalt halides mixed with copper or silver with carbon monoxide at extremely high temperatures and pressures.

In other words, the process of forming certain cobalt compounds, to be described below, is believed to constitute a much simpler, more easily opeable low temperature liquid phase type of process and constitutes in its broader aspects a better process for making certain cobalt compounds.

In further detail suspensions of metallic cobalt catalysts or of cobalt compounds, or solutions of cobalt compounds are treated with carbon monoxide at suitable temperatures and pressures. In the case of a suspension, the unreacted solids may be removed; the solutions made either from such suspensions or from solutions of cobalt compounds containing a soluble cobalt compound or cobalt compounds are effective catalysts for the addition of carbon monoxide and hydrogen to olefins to form aliphatic aldehydes. These soluble catalytically active cobalt compound or compounds are apparently cobalt carbonyl, and are formed as indicated in Equations 1 and 2.

(1) $2Co + 8CO \rightarrow (Co(CO)_4)_2$
(2) $2CoX_2 + 10CO + 2H_2O \rightarrow$
$(Co(CO)_4)_2 + 2CO_2 + 4HX$ Cobalt tetracarbonyl, $(Co(CO)_4)_2$, used for illustrative purposes in the above equations, is but one of many cobalt carbonyls which may be present in the solution prepared by the action of carbon monoxide on cobalt or cobalt compounds. Thus, a carbonyl of lower carbon monoxide content may be formed, such as cobalt tricarbonyl $(Co(CO)_3)_4$, or in the presence of an alcohol, such as methanol, a carbonyl may be formed with the composition indicated by the formula $Co_2(CO)_5 \cdot CH_3OH$. In the presence of hydrogen, cobalt carbonyl hydride, $HCo(CO)_4$, may be present.

The ease of formation of such cobalt carbonyl solutions depends on the form of cobalt subjected to treatment with carbon monoxide and the nature of the solvent in which the cobalt carbonyl formation is accomplished. Metallic cobalt catalysts suitable in themselves for promoting the addition of carbon monoxide and hydrogen to olefins will yield catalytically active cobalt solutions by treatment with carbon monoxide at moderate pressures and temperatures, suitably 300 p. s. i. or higher at 130° C. The time of treatment is a matter of only a few minutes. Since the pressures and temperatures required for the addition of carbon monoxide and hydrogen to olefins in the presence of the metallic cobalt catalyst itself are in the range just mentioned for the production of active cobalt solutions, it follows that solutions resulting from the reaction, the addition of carbon monoxide and hydrogen to olefins in the presence of a metallic cobalt catalyst, are catalytically active even after the removal of the solid cobalt catalyst. This is indeed the case.

Active solutions of cobalt carbonyl compounds can be made from solutions or suspensions of cobalt salts by treatment with carbon monoxide, although the conditions required are more drastic than are necessary in the case of metallic cobalt catalysts. A solution of cobalt acetate in butanol is quantitatively converted to cobalt carbonyl and cobalt carbonyl derivatives by agitation in the presence of carbon monoxide at 2000 to 3000 p. s. i. and 200° C. for one hour. If the initial concentration of cobalt acetate is in excess of one per cent, cobalt tetracarbonyl may be crystallized from the reaction mixture by chilling to a low temperature. Cobalt tetracarbonyl dissolved in various solvents is an effective catalyst for the addition of carbon monoxide and hydrogen to olefins. The mother liquor remaining after removal of cobalt tetracarbonyl still contains dissolved cobalt compounds which are very active as catalysts. It is apparent, then, that not only is cobalt tetracarbonyl an active catalyst for the addition of carbon monoxide and hydrogen to olefins, but other cobalt carbonyl complexes are also excellent catalysts.

The effectiveness of cobalt carbonyl solutions for catalysts in the addition of carbon monoxide and hydrogen to olefins is much superior to the solid metallic cobalt catalysts known to the art. For example, for equal conditions of temperature and pressure, cobalt tetracarbonyl in a concentration of 0.07 per cent is equivalent to a cobalt-thoria-magnesia-kieselguhr catalyst suspension containing 1.8 per cent cobalt. Cobalt carbonyl solutions made by treatment of cobalt or cobalt salts with carbon monoxide, and mother liquors remaining after removal of cobalt tetracarbonyl from such solutions, are all catalytically active in such low concentrations.

Monohydric aliphatic alcohols are preferred as solvents both for the preparation of cobalt carbonyl solutions from cobalt or cobalt compounds, and for the reaction medium in which carbon monoxide and hydrogen are added to olefins. In the preparation of cobalt carbonyls from cobalt salts, a monohydric alcohol serves as an acceptor for the acid released from the cobalt salt, according to the Equation 3:

(3) $2CoX_2 + 10CO + 4ROH \rightarrow$
$(Co(CO)_4)_2 + 2CO_2 + 4RX + 2H_2O$

The use of acid-binding agents such as lime or magnesia, or organic materials such as triethanolamine or pyridine, is not thought to be as satisfactory as untreated alcoholic solutions. Organic compounds such as pyridine are known to form complex compounds with cobalt tetracarbonyl, such as $Co_2(CO)_5(pyridine)_4$, and certain metal salts form compounds with cobalt tetracarbonyl which may be formulated as salts of cobalt carbonyl hydride, e. g., $(Co(CO)_4)_2Zn$. As mentioned before, alcohols will form additional complexes with cobalt carbonyls, but these complexes are efficient catalysts for the addition of carbon monoxide and hydrogen to olefins.

The peculiarly high activity of cobalt carbonyl solutions for catalysis of the addition of carbon monoxide and hydrogen to olefins permits the use of less drastic conditions of temperature and pressure than are known to the art for this method of preparation of aliphatic aldehydes. Thus for alcoholic solutions containing 1 to 2 mg./ml. of carbonyl cobalt, at 130° C., the threshhold pressure is approximately 200 p. s. i. partial pressure of hydrogen and a like pressure of carbon monoxide. To secure a practical speed of reaction, slightly higher pressures are desirable, i. e., 300 to 400 p. s. i. partial pressure each of hydrogen and carbon monoxide. Operational limits desirable for the addition of carbon monoxide and hydrogen to olefins are 100° C. to 200° C. and 500 to 5,000 p. s. i. pressure of reactant gases. The use of the higher temperatures and pressures is limited by the practicalities of controlling the violent reaction which ensues.

The following examples illustrate the preparation of cobalt carbonyl solutions and their use in the preparation of aldehydes and the like from olefins, carbon monoxide and hydrogen. In certain of the examples which follow, reference is made to catalyst No. 542. Catalyst No. 542 is a commercially obtainable material in the form of ⅛" x ⅛" pellets. This particular catalyst in the reduced condition is similar to the solid type of catalyst described in column 1 in connection with the prior art. That is, catalyst No. 542 contains approximately 36% cobalt, 2% thorium oxide, 2% magnesium oxide, and 60% kieselguhr. It will be noted, as the description proceeds, that other sources of catalytic cobalt may be utilized in the preparation of my homogeneous catalyst. Therefore, the specific compositions mentioned are to be regarded as illustrative and not limiting.

*Example I*

Twenty-five grams of reagent cobalt carbonate was reduced with hydrogen at 400° C. in a rotating tubular furnace. The reduced catalyst was suspended in 2500 cc. of n-butyl alcohol and was charged to a 1-gallon stainless steel rocking autoclave. The autoclave was heated to 130° C. and a gas mixture containing 30.9 per cent ethylene, a 32.9 per cent hydrogen and 31.1 per cent carbon monoxide was pressed in at 1800 p. s. i. A vigorous exothermic reaction set in and 18 cu. ft. of the gas mixture was absorbed in 22 minutes at 740 to 1800 p. s. i. and 128 to 158° C. The off-gas contained 1.6 per cent ethylene. The autoclave was cooled, the solid catalyst was allowed to settle, and the supernatant liquid was decanted into another 1-gallon stainless steel autoclave. The autoclave was heated to 130° C. and the gas mixture with the composition mentioned above was pressed in at 1360 p. s. i. The absorption started immediately and the exothermic nature of the reaction was evidenced by a temperature rise to 151° C., despite cooling of the autoclave with a blast of air. Eighteen cubic feet of the gas mixture was absorbed in 21 minutes at 700 to 1360 p. s. i. and 127 to 151° C. The off-gas contained 1.8 per cent ethylene. The reaction mixture was centrifuged and a trace of the original cobalt catalyst, which had failed to settle out and had been carried over in the decantation of the first reaction mixture, was isolated; it amounted to approximately 0.5 g.

*Example II*

A suspension of 50 g. of reduced catalyst No. 542 in 950 g. of n-butyl alcohol was charged to a 1-gallon stainless steel autoclave and was heated to 130° C. A gas mixture containing 31.2 per cent ethylene, 32.0 per cent hydrogen, and 32.4 per cent carbon monoxide was pressed in at 1000 p. s. i. After an induction period of 2 to 3 minutes, the reaction started and 19 cu. ft. of the gas mixture was absorbed in 15 minutes at 800 to 1000 p. s. i. and 128 to 151° C. The off-gas contained 3.0 per cent ethylene. The bomb was cooled and the product was removed and centrifuged. A clear, dark, wine-colored solution, free of suspended solids, was obtained. A 1-gallon stainless steel autoclave was charged with 100 g. of n-butyl alcohol, heated to 130° C. and the same gas mixture used above was pressed in to 1000 p. s. i. The temperature, which had dropped to 100° C. during the charging of the gas mixture, was again adjusted to 130° C., and the centrifuged reaction solution, weighing 1237 g., was pumped into the autoclave. When approximately two-thirds of the solution had been added to the autoclave, an exothermic absorption of the gas mixture started. The remaining solution was pumped in while the pressure on the autoclave was maintained at 1000 p. s. i. by the addition of fresh gas. Despite cooling, the reaction temperature rose to 146° C. In 15 minutes, 18.5 cu. ft. of the gas mixture was absorbed. The reaction mixture, which had gained 353 g. in weight, contained 1.7 mg./ml. of cobalt.

*Example III*

One thousand grams of a 5 per cent suspension of reduced catalyst No. 542 in n-butyl alcohol was charged to a 1-gallon stainless steel autoclave. The autoclave was heated to 130° C. and carbon monoxide was pressed in to a pressure of 340 p. s. i. A slight absorption took place. After 30 minutes the bomb was cooled and the catalyst suspension was removed and centrifuged. The resultant solution, free of solids, contained 1.45 mg./ml. of cobalt. This solution was pumped into a stainless steel rocking autoclave of 1-gallon capacity, which had previously been charged with 100 g. of n-butyl alcohol, heated to 130° C., and filled with a gas mixture containing 34.8 per cent ethylene, 31.2 per cent hydrogen and 29.4 per cent carbon monoxide to a pressure of 1000 p. s. i. When 500 cc. of the solution had been added to the autoclave, a vigorous exothermic reaction started. The remaining solution was pumped into the autoclave while the pressure was maintained at 1000 p. s. i. by addition of more of the gas mixture. In 14 minutes, 18.3 cu. ft. of the gas was absorbed; when the gas supply was cut off, the pressure in the autoclave dropped to 400 p. s. i. Despite cooling, the exothermic nature of the reaction raised the temperature to 142° C. during the course of the run. By distillation of the reaction mixture, 92 g. of propionaldehyde was recovered, which was 26 per cent of the theoretical amount, based on the carbon monoxide consumed.

*Example IV*

A 1-gallon stainless steel rocking autoclave was charged with 10 g. of commercial grade cobaltous acetate and 1000 g. of n-butyl alcohol. The autoclave was heated to 200° C. and carbon monoxide was pressed in to 3000 p. s. i. pressure. No visible absorption occurred, and after 2 hours the autoclave was cooled and vented. The dark reaction solution, which contained 1.62 mg./ml. of cobalt, was pumped into an autoclave preheated to 130° C. and precharged with 100 g. of n-butyl alcohol and 1000 p. s. i. pressure of gas mixture containing 33.5 per cent ethylene, 31.4 per cent carbon monoxide and 32.0 per cent hydrogen. The reaction started when 250 cc. of the solution had been pumped into the autoclave.

All the solution, amounting to 1175 cc., was pumped in while the pressure of the added gas mixture was maintained at 1000 p. s. i. In 23 minutes, 18.6 cu. ft. of gas was absorbed; when the gas supply was cut off, the autoclave pressure fell to 400 p. s. i. During the absorption at 1000 p. s. i., the temperature rose to 142° C., despite cooling of the autoclave. The reaction solution contained 148 g. of propionaldehyde, which was 40 per cent of the theoretical yield, based on the carbon monoxide consumed.

*Example V*

A mixture of 150 g. of commercial grade cobaltous acetate and 1350 g. of n-butyl alcohol was placed in a 1-gallon stainless steel rocking autoclave and was agitated at 200° C. under a pressure of 3000 p. s. i. of carbon monoxide for 2 hours. The dark reaction solution contained 21.8 mg./ml. of cobalt; no cobaltous salts were present, as determined by spectral transmittance. The acid number of the solution was zero.

When the solution was chilled in a cold box (—40° C.) yellow crystals of cobalt tetracarbonyl were deposited. These were filtered, washed with cold methanol and dried under an atmosphere of carbon monoxide. The yield was 61 g. or 51 per cent of the theoretical. The filtrate remaining after removal of the cobalt tetracarbonyl contained 8.64 mg./ml. of cobalt.

*Example VI*

A solution of 10 g. of the cobalt tetracarbonyl prepared in Example V in 1000 g. of commercial xylene was placed in a 1-gallon stainless steel autoclave. Carbon monoxide was added to a pressure of 200 p. s. i. to prevent decomposition of the carbonyl while the autoclave was heated to 130° C. At 130° C., the total pressure on the autoclave was 290 p. s. i. A gas mixture containing 29.3 per cent ethylene, 36.7 per cent hydrogen and 31.3 per cent carbon monoxide was pressed in to a partial pressure of 1000 p. s. i., making a total pressure of 1290 p. s. i. in the autoclave. The reaction started immediately, and 16.3 cu. ft. of the gas mixture was absorbed in 20 minutes. The temperature was maintained at 127 to 137° C. The off-gas from the reaction contained only 1.4 per cent ethylene. By distillation, 215 g. of propionaldehyde was isolated from the reaction solution, which was 55 per cent of the theory, based on carbon monoxide consumed.

*Example VII*

A solution of 6.8 g. of cobalt tetracarbonyl in 1000 g. of butanol was placed in a 1-gallon stainless steel autoclave, carbon monoxide was pressed in to a pressure of 200 p. s. i., and the autoclave was heated to 130° C. At this temperature the total pressure on the bomb was 290 p. s. i. A gas mixture containing 31.2 per cent ethylene, 34.7 per cent hydrogen and 31.6 per cent carbon monoxide was pressed into the bomb to a partial pressure of 1000 p. s. i. (total pressure, 1290 p. s. i.). A violent reaction immediately took place; the temperature rose rapidly to 177° C. and 16.8 cu. ft. of the gas mixture was absorbed in 4 minutes. The autoclave was cooled, vented and emptied. The off-gas contained 1.3 per cent ethylene. By distillation of the reaction solution, 114 g. of propionaldehyde was recovered, which was 30 per cent of the theory, based on the carbon monoxide consumed.

Similar experiments in n-butyl alcohol at different concentrations of cobalt tetracarbonyl required the following reaction time for absorption of approximately 18 cu. ft. of ethylene-carbon monoxide-hydrogen mixture at 1000 p. s. i. partial pressure and 130° C. (initial temperature).

| Wt. Percent Cobalt Tetracarbonyl | Cobalt Conc., mg./ml. | Reaction Time, Min. |
|---|---|---|
| 1.58 | 4.4 | 2 to 3. |
| 0.68 | 1.9 | 4. |
| 0.34 | 0.95 | 7. |
| 0.20 | 0.56 | 20. |

*Example VIII*

A 1-gallon stainless steel rocking autoclave was charged with a solution of 361 g. of the filtrate remaining after removal of the cobalt tetracarbonyl prepared in Example V, diluted with n-butyl alcohol to a total of 1000 g. The solution then contained 3.0 mg./ml. of cobalt. The autoclave was filled with carbon monoxide to a pressure of 200 p. s. i., and was heated to 130° C. At this temperature, the total pressure in the bomb was 290 p. s. i. A gas mixture containing 29.3 per cent ethylene, 36.7 per cent hydrogen and 31.3 per cent carbon monoxide was pressed into the autoclave to a partial pressure of 1000 p. s. i. (total pressure in the autoclave, 1290 p. s. i.). A violent reaction started immediately, and despite cooling, the temperature rose rapidly to 177° C. In 3 minutes, 16.2 cu. ft. of the gas mixture was absorbed. The off-gas contained 1.7 per cent ethylene. Propionaldehyde was isolated by distillation of the reaction solution; the yield was 124 g., or 34 per cent of the theory, based on carbon monoxide consumed.

It can be seen from the above examples that I have provided a much simpler way of forming certain cobalt compounds. These compounds function to supply a very active homogeneous catalyst solution which catalyst solution evidences an improved reactivity by the shortened reaction rates obtainable in the reaction of, for example, an olefin with carbon monoxide and hydrogen.

From the practical standpoint it will be observed that the improved reactivity of my homogeneous catalyst is particularly valuable in that only a relatively small amount of my catalyst, say for example one-eightieth of the cobalt heretofore required, is entirely operative in catalyzing the reaction of an olefin with carbon monoxide and hydrogen at a reasonable reaction rate. This feature of being able to employ only a small amount of catalyst and still obtain good reaction makes it practical to carry out a reaction of olefins, carbon monoxide, and hydrogen without the need of elaborate additional equipment for attempting to recover cobalt catalyst. Of course, if it is desired to recover the cobalt catalyst in my process, since a small amount of cobalt is involved, the recovery problem is proportionately reduced.

While the foregoing represents my preferred method of manufacturing and utilizing a homogeneous cobalt-containing catalyst solution, in accordance with another species of my invention, a similar type catalyst may be prepared in situ in the reaction of an organic compound having a double bond with carbon monoxide and hydrogen. In the description which follows of this other species of my invention, the induction period at the start of the reaction period, probably may be considered the period in which active homogeneous catalyst is being formed.

In the above description, as well as the description which follows, in all examples substantial yields of products, such as propionaldehyde in the above examples, were obtained. Also other products such as ketones and the like were obtained. However, as pointed out at the outset since it is already known that various olefins may be reacted with carbon monoxide and hydrogen to obtain carbonyl compounds, extended description of product formation has not been given in the examples on this aspect. On the other hand, attention has been directed to the improvements of the present invention, including better catalytic activity, much greater speed of reaction and the like even when smaller amounts of catalyst were used. It may be added that such advantages were attained without sacrifice of desired product. The above active catalyst may be employed in other solvents than alcohol, as for example in the various hydrocarbon solvents such as xylene, petroleum ether, solvent naphtha, and the like.

While the foregoing represents one preferred method for the manufacture and utilization of my improved catalyst comprising a hydroxy solvent having incorporated therein an active metal, certain aspects of my invention may be carried out by forming the active catalyst in situ. Such other species of the invention will be apparent from the description which follows. In these other species it is probable that the induction period at the start of the process constitutes a period in which active catalyst is formed. However, it is not desired to be bound by any theory concerning the mechanism concerning the functioning of the more active catalyst described herein.

In accordance with the species of process which follows the combination of a compound such as an olefin with carbon monoxide and hydrogen in the presence of a suitable catalyst to form oxygenated compounds is accomplished with great ease and under milder conditions if, for example, a monohydric aliphatic alcohol is used as the reaction medium at least part of the time during the process.

Alcohols suitable as reaction mediums in this process include methanol, ethanol, butanol, etc. It is preferred that a primary alcohol be used to obtain the most active reaction medium. The alcohol may or may not be anhydrous. The cobalt catalyst is prepared by reduction of cobalt carbonate with hydrogen at 400° C.; such a catalyst, consisting of pure cobalt, or any of several commercially available "promoted" cobalt catalysts, which contain magnesia, thoria, etc., and an inert support such as kieselguhr, are suitable for effecting the combination of olefins, carbon monoxide and hydrogen to produce aliphatic aldehydes. Olefins capable of being converted to aldehydes by addition of carbon monoxide and hydrogen include ethylene, propylene, butylene and cyclohexene. Various substituted olefins may also be used, such as methyl acrylate and allyl alcohol. Water gas or any equivalent mixture of carbon monoxide and hydrogen can be used in the process. The reaction may be carried out as a batch operation or in a continuous fashion, and after removal of the desired products, e. g., by distillation, the alcohol-catalyst mixture may be returned to the reaction vessel for further use.

The catalyst in a continuous type operation may be used as a fixed bed or it may be suspended in a finely-divided form in the reaction medium. The use of a slurry or suspension of the catalyst in the reaction medium is preferable in view of the exothermic nature of the reaction and the difficulty of cooling a fixed bed catalyst. Suitable concentrations of catalyst in suspension are in the range of 1 to 5 percent of cobalt; the preferred composition depends on the pressure of the olefin, carbon monoxide and hydrogen employed and the temperature at which the reaction is carried out. The reaction has a threshold temperature of 90° at a partial pressure of 500–600 p. s. i. of carbon monoxide and hydrogen; these values are approximate and vary according to the activity of the catalyst, the particular olefin used, and the nature of the alcohol which serves as a reaction medium. Similarly, the optimum conditions for a rapid rate of aldehyde formation are dependent on several factors, but in general a temperature of 130° C. is desirable at a partial pressure of 600–700 p. s. i. of carbon monoxide and hydrogen.

The following examples illustrate the operation of the invention:

*Example IX*

One hundred grams of catalyst No. 542, in the form of ⅛" x ⅛" cylinders, was reduced in a slow stream of hydrogen at 400° C. for 1 hour, cooled in the hydrogen stream and dumped into 2500 cc. of n-butyl alcohol. This mixture was placed in a 1-gallon stainless steel rocking autoclave, which was then closed, purged with nitrogen and heated to 130° C. A gas mixture containing 34.5 percent ethylene, 32.7 percent hydrogen and 30.5 percent carbon monoxide was pressed into the autoclave at 1500 p. s. i. After an induction period of 50 minutes, absorption of the gas suddenly started, and 15.2 cubic feet was absorbed in 1 hour. The gas mixture was added at such a rate that 1500 p. s. i. pressure was maintained in the autoclave. At the end of the above reaction time, the autoclave was cooled and the product removed. The yield of propionaldehyde recovered by distillation was 223 g. or 70 percent of the theoretical amount, based on carbon monoxide consumed.

*Example X*

One hundred grams of catalyst No. 542 was reduced as in Example IX, and was then placed in a ball mill with a little methanol and ground to a fine powder. The resulting slurry was diluted with methanol to 2500 cc. and charged to a 1-gallon stainless steel rocking autoclave. After being flushed with nitrogen, the autoclave was heated to 130° C. and a gas mixture containing 32.1 percent ethylene, 33.9 percent hydrogen and 30.9 percent carbon monoxide was pressed in to 1500 p. s. i. The ensuing reaction was too vigorous to control, and the catalyst concentration was reduced to 50 g. (unreduced basis) per 2500 cc. of methanol. There was no induction period and 17 to 18 cubic feet of the gas mixture was absorbed at 1000–1500 p. s. i. and 130–140° C. in 26 minutes.

*Example XI*

One hundred grams of reagent cobalt carbonate was reduced with hydrogen at 390° C. in a stainless steel rotating furnace. The reduced catalyst was suspended in 2500 cc. of butanol and was treated with a gas mixture consisting of 30.9 percent ethylene, 32.9 percent hydrogen and 31.1 percent carbon monoxide at 1500 p. s. i. and 130° C. Absorption was too rapid to permit efficient temperature control, and the pressure was reduced progressively to 700 p. s. i. In 30 minutes, 17.5 cubic feet of the gas mixture was absorbed. The reaction temperature varied from 130 to 153° C. during the experiment. By distillation of the reaction mixture, 478 g. of low-boiling compounds was obtained; redistillation of this mixture gave 205 g. of propionaldehyde, or 53 percent of the theoretical yield, based on carbon monoxide consumed.

Example XII

Catalyst 542 was reduced at 400° C. by a rapid stream of hydrogen, which was recycled after removal of carbon dioxide and water. Fifty grams of the reduced catalyst, finely ground in a ball mill, was suspended in 950 g. of butanol. The suspension was placed in a 1-gallon stainless steel rocking autoclave, heated to 130° C. and treated with a gas mixture containing 31.9 percent ethylene, 31.5 percent hydrogen and 32.5 percent carbon monoxide. At 800–1000 p. s. i., approximately 18 cubic feet of gas was absorbed in 15 minutes; when gas was no longer supplied to the autoclave, the pressure dropped to 300 p. s. i. Good yields of aldehyde were obtained.

Example XIII

A 5 percent suspension in n-hexane of the same catalyst used in Example XII was treated at 130° C. with a mixture of 33.5 percent ethylene, 32.0 percent hydrogen and 31.4 percent carbon monoxide. At 1000 p. s. i. no reaction occurred. At 1500 p. s. i., 16.3 cubic feet of the gas was absorbed in 45 minutes When the gas supply was shut off, the pressure in the autoclave fell to 700 p. s. i. The off gas contained 27.1 percent ethylene, 23.3 percent hydrogen and 30.8 percent carbon monoxide. Good yields of aldehyde were isolated.

Example XIV

A 5 percent suspension in n-butyl alcohol of the catalyst used in Examples XII and XIII was treated with a gas containing 30.9 percent ethylene, 36.1 percent hydrogen and 28.5 percent carbon monoxide, at 1000 p. s. i. and 130° C. After an 8-minute induction period, 17.5 cubic feet of gas was absorbed in 16 minutes. After removal of the gas supply, the pressure in the autoclave dwindled to 350 p. s. i. The off gas contained 27.4 percent ethylene, 29.4 percent hydrogen and 23.5 percent carbon monoxide. Aldehyde was isolated as in the other examples.

Example XV

Three hundred grams of 542 catalyst, reduced as described in Example XII, was suspended in n-butyl alcohol to give a concentration of 3.5 percent solids. This suspension was pumped through a series of 3 steam-heated steel reaction tubes, each tube being 5' x 1.5" I. D. A gas mixture containing 23 percent ethylene, 28 percent hydrogen, 26 percent carbon monoxide and 20 percent methane was pressed into the first reactor at 2300 p. s. i. The temperature in the reactors was maintained at 140° C. The effluent from the third reactor was fed to a separator where unabsorbed gas was removed and recycled. The liquid product was released to atmospheric pressure and distilled to remove propionaldehyde. The bottoms from the still were recycled to the first reactor.

Over a period of 6.25 hours, 1490 cubic feet of gas mixture was fed to the reactors and 980 cubic feet was collected; 34 percent of the gas was absorbed at 82 cubic feet per hour and 57 percent of the ethylene was absorbed. The propionaldehyde collected weighed 3780 g., or 30 percent of the theory, based on ethylene absorbed. Analyses of the off gas during the run showed that this yield could have been further improved by removal of propionaldehyde from the off gas.

It may be seen from the above examples that I have provided a more active catalyst which may be utilized in a number of ways in reactions of the class indicated. It will be observed that my improved catalyst functions efficiently even when employed in relatively small amounts. While for the purposes of illustration cobalt has been described as the preferred catalytic metal, other eighth group metals such as iron, or for example mixtures of iron and cobalt, may also be processed in hydroxy solvents to give useful and active catalysts. Likewise, in several examples ethylene has been the particular olefin processed and described for the purposes of illustration since this is the common commercially available olefin, but the present process is not limited to this specific olefin. As has been pointed out, it is already known in the art that various olefins or similar type compounds containing a double bond may be reacted with carbon monoxide and hydrogen. Consequently, there is no need to direct description thereto and the description of the present application has been directed in particular to the improved catalyst and its preparation. Similar remarks apply to the ratio of gases such as the amounts of olefin, carbon monoxide, and hydrogen processed. In general the content of each of these gases in a gas mixture would exceed 20 percent. While in some instances it might be preferred to use considerable excess hydrogen, in general any of the usual gas compositions and ratios heretofore employed in the art may likewise be employed in the present process.

I claim:

1. A process for catalytically synthesizing lower aliphatic aldehydes, comprising preparing a cobalt carbonyl catalyst-containing reaction medium by incorporating a source of cobalt selected from the group consisting of cobalt salts and reduced cobalt in a liquid consisting of a 1–4 carbon primary aliphatic alcohol, and treating the alcohol and source of cobalt at 100–300° C. and 500–3000 p. s. i. with carbon monoxide in sufficient quantity and for a sufficient period of time to form such cobalt carbonyl catalyst-containing reaction medium, introducing the reactants carbon monoxide, hydrogen and an olefin selected from the group consisting of ethylene and propylene into said reaction medium, and carrying out the aldehyde synthesis reaction with said reactants at about 500–5000 p. s. i. and 100–200° C. in said cobalt carbonyl-containing reaction medium.

2. A process according to claim 1 for synthesizing butyraldehyde, wherein the alcohol is n-butanol, the source of cobalt is cobalt acetate, and the olefin is propylene.

3. A process according to claim 1 for synthesizing butyraldehyde, wherein the alcohol is n-butanol, the source of cobalt is reduced cobalt, and the olefin is propylene.

(References on following page)

References Cited in the file of this patent

UNITED STATES PATENTS

| Number | Name | Date |
|---|---|---|
| 1,698,602 | Mittasch et al. | Jan. 8, 1929 |
| 1,998,470 | Taylor | Apr. 23, 1935 |
| 2,327,066 | Roelen | Aug. 17, 1943 |
| 2,433,072 | Stewart et al. | Dec. 23, 1947 |
| 2,448,375 | Larson | Aug. 31, 1948 |
| 2,449,470 | Gresham et al. | Sept. 14, 1948 |
| 2,476,263 | McKeever | July 12, 1949 |
| 2,497,303 | Gresham et al. | Feb. 14, 1950 |
| 2,504,682 | Harlan | Apr. 18, 1950 |
| 2,576,113 | Hagemeyer | Nov. 27, 1951 |
| 2,600,571 | Pritchard | June 17, 1952 |

OTHER REFERENCES

Proceedings, Technical Oil Mission Meeting, December 13 and 14, 1945, pages 137 to 139, Distributed by Foreign Synthetic Liquid Fuels Div., Bureau of Mines.

I. G. Farbenindustrie Aktiengesellschaft Patent Applications O. Z. 13,366 and O. Z. 13,705 TOM Reel 36, deposited in Library of Congress, March 12, 1946. (English translation available in Meyer Translation, Oxo Process, pages 35–37 and 62–63.)

"Interrogation of Dr. Otto Roelen," PB–77705 July 18, 1947, pages 43 to 47, Hobart Publishing Co., Washington, D. C.

FIAT Final Report 1000 (PB–81383), available to public, December 26, 1947, pages 13, 14.

Adkins et al., J. A. C. S., vol. 70, No. 1, pages 383 to 386 (1948).